No. 736,101. PATENTED AUG. 11, 1903.
G. B. HOUGH.
DENTAL TOOL.
APPLICATION FILED OCT. 30, 1902.
NO MODEL.
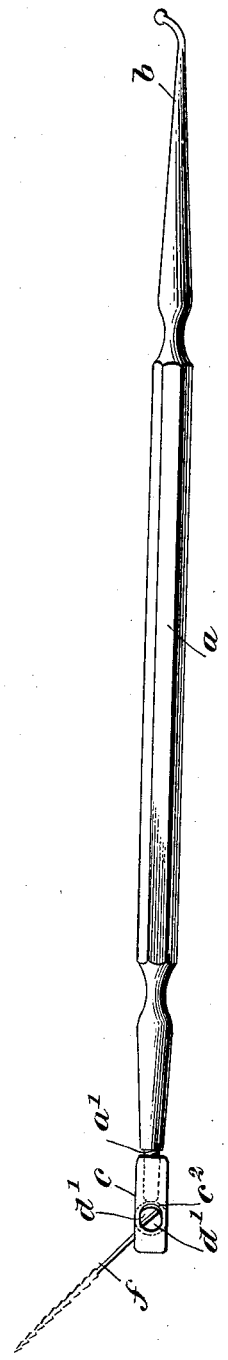
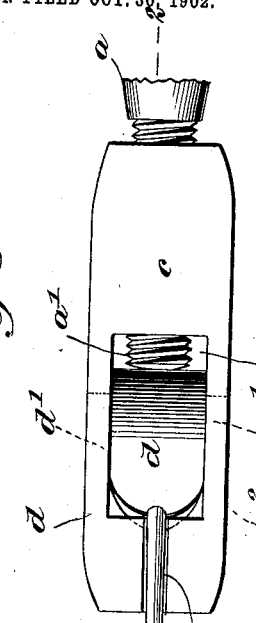
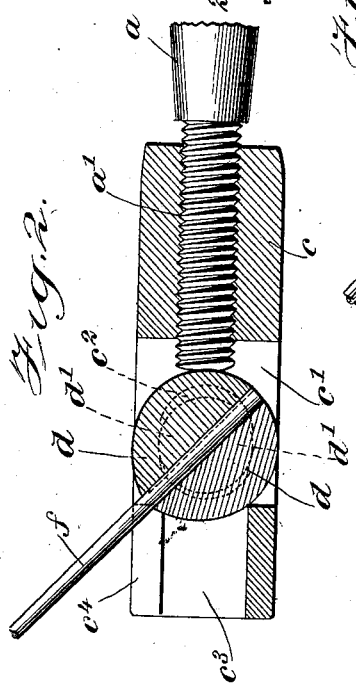
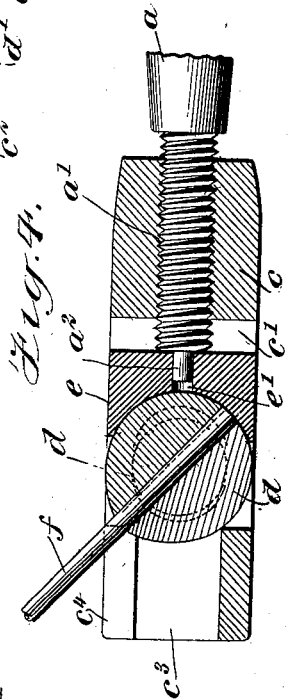
WITNESSES:
INVENTOR
Gershom B. Hough
BY
ATTORNEYS.

No. 736,101.

Patented August 11, 1903.

UNITED STATES PATENT OFFICE.

GERSHOM B. HOUGH, OF SOMERSET, PENNSYLVANIA.

DENTAL TOOL.

SPECIFICATION forming part of Letters Patent No. 736,101, dated August 11, 1903.

Application filed October 30, 1902. Serial No. 129,377. (No model.)

*To all whom it may concern:*

Be it known that I, GERSHOM B. HOUGH, a citizen of the United States, and a resident of Somerset, in the county of Somerset and State of Pennsylvania, have invented a new and Improved Dental Tool, of which the following is a full, clear, and exact description.

This invention relates to a tool intended to hold the "broach" ordinarily used in dentistry for removing the nerve from teeth.

The invention comprises a peculiarly-constructed clamp or chuck to which broaches of numerous kinds are applicable and by means of which the broaches may be held in any desired position with respect to the handle.

This specification is an exact description of two examples of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is an enlarged section on the line 2 2 of Fig. 3. Fig. 3 is a plan view of the invention, and Fig. 4 is a sectional view showing a slight modification of the invention.

$a$ represents the handle of the tool, and this may be provided at one end with a tool $b$ of any sort desired—for example, of the form shown in Fig. 1. At its other end the handle $a$ is provided with a reduced threaded portion $a'$, and this is screwed into a head-piece $c$, this head-piece having a cavity $c'$ formed therein, the side walls of said cavity having openings $c^2$, transversely alined with each other, and the outer end wall of the cavity having a central opening $c^3$, communicating with a longitudinally-disposed slot $c^4$, leading from the outer end of the head $c$ into the cavity $c'$ thereof. The screw $a'$ projects through into the cavity $c'$, as shown best in Fig. 2. Within the cavity $c'$ is located a clamp which comprises two approximately-semicylindrical sections $d$, having semicylindrical trunnions $d'$ at each end, these trunnions being located in the openings $c^2$, so that the sections $d$ of the clamp are allowed to be moved apart or tightened together to clamp the tool, which is indicated at $f$. The clamping action is produced by moving the screw $a'$ inward into engagement with the two parts of the clamp, thus binding the clamp firmly against the outer end of the cavity $c'$. The trunnions $d'$ are movable freely through the openings $c^2$, and owing to this the clamp may be adjusted to any position desired.

In using the invention the tool $f$ (for example, the broach shown in Fig. 1) should have its shank inserted between the two parts of the clamp, and then by turning the clamp on its trunnions $d'$ the tool may be placed in any position desired with respect to the handle. After this the screw $a'$ should be moved up against the clamp-sections, so as firmly to hold them.

If desired, a follower $e$ may be used between the screw $a'$ and the clamp $d$, this follower lying in the cavity $c'$ of the head $c$ and having a centrally-disposed opening $e'$, receiving loosely a small stud $a^2$ on the end of the screw $a'$. The follower also has a concave outer face which matches the clamp. In this form of the invention the action is the same as that described where the follower is omitted.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a head, a screw working therein, and a rocking clamp mounted in the head and engaged by the screw.

2. The combination of a head, a screw working therein, and a rocking clamp carried adjustably in the head and engaged by the screw, the said clamp being formed of separate sections forced into active position by the screw.

3. The combination of a head having a cavity therein and having laterally-alined openings in the side walls of the cavity, a clamp formed in two sections each having trunnions fitted within the said laterally-alined openings, and means for pressing the clamp-sections into active position.

4. The combination of a head having a cavity therein and having laterally-alined openings in the side walls of the cavity, a clamp formed in two sections each having trunnions fitted within the said laterally-alined openings, and means for pressing the clamp-sections into active position, said means comprising a screw working in one end of the head.

5. The combination of a handle having a screw thereon, a head threaded on the screw, and a clamp adjustably carried by the head and engaged by the screw, for the purpose specified.

6. The combination of a handle having a screw thereon, a head threaded on the screw, and a clamp adjustably carried by the head and engaged by the screw, for the purpose specified, said clamp being formed in two sections each having trunnions rockably mounted in the head.

7. The combination of a head having a cavity therein, and having also laterally-alined openings in the side walls of the cavity, a clamp formed in two sections, each having trunnions placed in said openings, and means for bearing against the clamp to hold its sections in active position.

8. The combination of a head having a cavity therein, and having also laterally-alined openings in the side walls of the cavity, a clamp formed in two sections each having trunnions placed in said openings, and means for bearing against the clamp to hold its sections in active position, the head also having an opening extending from the cavity outward to the end of the head and a slot communicating with said opening and disposed longitudinally of the head and extending from the cavity outward to the end of the head.

9. The combination of a head having a cavity therein, a clamp mounted to rock in said cavity, a follower bearing against the clamp, and means for exerting pressure on the follower to hold the clamp against movement and in any position of adjustment.

10. The combination of a head, a clamp mounted therein, a follower mounted in the head and bearing on the clamp, and a handle having a screw thereon, the screw working in the head and engaging the follower, for the purpose specified.

In testimony whereof I have signed my name to this specification in the presence of two subscribing witnesses.

GERSHOM B. HOUGH.

Witnesses:
RUFUS E. MEYER,
MAYME KIFER.